United States Patent [19]
Heinzerling

[11] Patent Number: 5,475,393
[45] Date of Patent: Dec. 12, 1995

[54] PRECISION LANDING SYSTEM

[76] Inventor: Edward W. Heinzerling, 3483 W. Seneca Turnpike, Syracuse, N.Y. 13215

[21] Appl. No.: 130,703

[22] Filed: Oct. 4, 1993

[51] Int. Cl.$^6$ ................................ G01S 1/16; G01S 1/18
[52] U.S. Cl. .................................................. 342/410
[58] Field of Search ................................. 342/410, 411, 342/412, 413

[56] References Cited

U.S. PATENT DOCUMENTS

| | | |
|---|---|---|
| 3,564,543 | 2/1971 | Nehama . |
| 3,680,120 | 7/1972 | Benjamin . |
| 3,697,997 | 10/1972 | Cooper . |
| 3,713,159 | 1/1973 | Hoffman . |
| 3,798,646 | 3/1974 | Buehler . |
| 3,887,922 | 6/1975 | Hofgen et al. . |
| 3,965,443 | 6/1976 | Towle et al. . |
| 3,971,025 | 7/1976 | Levine . |

Primary Examiner—Theodore M. Blum
Attorney, Agent, or Firm—Harris Beach & Wilcox

[57] ABSTRACT

An aircraft landing system employs an array of antennas aligned across the runway, and equipment on board the aircraft employs radio interferometry to measure path length differences between the aircraft and selected pairs of the antennas. The antennas each include circuitry for sideband modulation of a basic FM signal so that each antenna radiates a pair of sidebands displaced above and below the basic signal by a respective number of increments. The FM signal can be carried on an X-band carrier of nominally ten GHz, with a frequency deviation of ±250 MHz and a modulating frequency of 20 Hz. Further antennas provide taxiing guidance. Data can be communicated on the system.

20 Claims, 11 Drawing Sheets

CIRCULAR HORN
ANTENNAS T7→T10

KNIFE LEDGE DIFFRACTION
BRIGHT REGION
SHADOW REGION
−6dB

BUILDING
ANTENNAS T1→T6
ABSORBING SCREEN
RADIATING ELEMENT

PRECISION LANDING SYSTEM

BACKGROUND OF THE INVENTION

This invention relates to aircraft landing systems, and is more specifically directed to a radio landing system in which the position of an aircraft approaching a runway can be determined precisely, in terms of azimuth, range, and elevation relative to the runway. The invention is particularly concerned with a landing system which employs radio interferometry to guide the aircraft to a safe landing. The same or similar system can also guide the aircraft on the ground while taxiing to avoid ground collisions or running off the tarmac, runway, or taxiway. The system can operate with an unlimited number of aircraft simultaneously, and can provide all aircraft with position information as they perform the landing maneuver, and can do so without the aircraft experiencing radio interference with one another.

Currently under adverse visibility conditions, airports employ an Instrument Landing System (ILS) to guide instrumented aircraft to land. This system is often lacking in precision and reliability and requires visual means to complete the touchdown and roll out portions of the landing maneuver.

Landing systems have also been proposed which employ a number of radio antennas, arrayed in a geometrical configuration on the ground, to guide an aircraft during its landing maneuver under low visibility conditions. One such proposal involves a triangulation technique known as trilateralization to derive X,Y,Z coordinates of an aircraft. In this case the radio antennas are disposed about halfway down the runway and at a distance at opposite sides of the runway center line. A transponder aboard the plane answers a coded interrogation, and the return signal is received at each of the ground antennas, which then permit computation of the respective radii to the aircraft. This system, described in U.S. Pat. No. 3,564,543, requires a specially modulated square-wave signal, with pseudorandom noise coding to permit ranging.

Other aircraft landing systems include fan beam types with antennas located at each side of the runway emitting slanted signals. An example of such a system is described in U.S. Pat. No. 3,713,159. Other guidance systems are described in U.S. Pat. No. 4,017,862, and U.S. Pat. No. 3,789,646.

OBJECTS AND SUMMARY OF THE INVENTION

It is an object of the invention to provide a high precision aircraft landing system employing radio interferometry principles, and which avoids the drawbacks of the prior art.

It is a more specific object to provide an aircraft landing system with high precision, that is, with a precision of about one inch in terms of interferometer path length difference thereby facilitating automatic landing of the aircraft. In order to achieve this high precision, the system is designed to minimize the error produced by multipath propagation.

According to one aspect of this invention, a continuous-wave radio frequency interferometer provides precision aircraft position and velocity information to the aircraft so that it may be guided during its landing maneuver. Its inherent high accuracy permits completely automatic, Category 3C landing. On the ground there are six transmitting antennas broadcasting phase-coherent continuous wave signals. In the aircraft, the signals are received and a path length difference is derived, i.e., from the aircraft to a respective pair of transmitting antennas. These path length differences are used to compute range, elevation and azimuth information, and can also be used to derive velocity information. As shown in FIGS. 1 and 1A, the first and second transmit antennas are situated at a predetermined distance along the runway and at a predetermined elevation above it, and spaced a distance on either side of the runway center line. Third and fourth antennas are located in line with these at the same distance along the runway and at the same elevation above it, but spaced further from the runway centerline than the first and second antennas. Fifth and sixth antennas are positioned below the first and second antennas but a short distance nearer the approach end of the runway in advance of them.

There are radio frequency transmitters associated with the respective antennas, each providing its respective antenna with a frequency modulated signal. These signals are all derived from the system synchronizer and are phase coherent. One transmitter T1 (or alternately T2) is designated the master transmitter since it has an unobstructed view of the landing aircraft and is near the center of the transmitting array. The master transmitter radiates a relatively high power signal (about 100 watts) to the landing aircraft. It is used to phase-lock the aircraft phase-locked-loop receiver. The master transmitter generates a radio frequency carrier at a predetermined center frequency and is modulated by a modulating signal having a predetermined waveform and modulating frequency. The modulating signal produces a predetermined frequency deviation. In a preferred embodiment, the radio frequency center frequency is in the X-band, i.e. about 10 GHz, the frequency deviation is about ±250 MHz about the center frequency and the modulation frequency or repetition frequency is about 20 Hz. Each of the radio frequency transmitters, T1 through T6, generates two sidebands about the master transmitter instantaneous frequency using a double side-band suppressed carrier (DSSC) modulation technique i.e., so called Costas modulation (Costas, John, Synchronous Communications, 44 Proc. IRE 1713–1718, Dec. 1956). These sideband transmitters are designated "slave" transmitters since they follow in frequency the master transmitter. These sidebands are spaced above and below the master transmitter frequency by a predetermined frequency off-set which is unique for each transmitter and which is used in the airborne analog signal conditioner to identify the transmitter from which the signals are radiated and to separate it from all other signals. Tower antenna T1 (or alternatively T2) radiates both a master and a slave transmitter signal. The pair of sidebands from each transmitter are used in the airborne analog signal conditioner to generate a signal at the average frequency between the sidebands. This average frequency is identical in its phase information to that which would be generated had the signal from each transmitter been generated at the master transmitter signal frequency. In effect, the double sideband suppressed carrier scheme permits multiple transmitters to transmit simultaneously at the same frequency without mutual interference between signals.

In a preferred embodiment, the unique off-set frequencies are within about ±10 MHz of the master transmitter signal. The off-set frequencies are, in fact, selected to prevent mutual interference between all transmit signals as determined by the expected phase/frequency modulation due to aircraft position and velocity and by the bandwidth of the receiver and analog signal conditioner phase-locked-loops which track these signals.

A 20 Hz modulating voltage is used for frequency modulating all the transmit signals. It consists of two regions of constant voltage referred to as the upper and lower plateaus. The transition between the plateaus follows segments of $V=f(t^3)$ which permit a smooth transition between the upper and lower plateaus. When this voltage is applied to a linear voltage-controlled-oscillator, the frequency deviation pattern shown in FIG. 7A for the master transmitter is produced. The constant upper plateau frequency is about 250 MHz above the master transmitter center frequency $f_c$ and the constant lower plateau frequency is about 250 MHz below the transmitter center frequency. The smooth transitions between the upper and lower plateau frequencies are designed to minimize tracking errors in the phase-locked-loops which track the frequency modulated signal.

FIG. 1A shows an aircraft that is about to land and a block diagram of the landings system avionics. The superheterodyne airborne receiver phase-locks to the master transmitter signal. The receiver local oscillator tracks the received signal from the master transmitter and in so doing removes any phase modulation due to the frequency sweep and aircraft motion from the intermediate frequency master signal. At the intermediate frequency, the dual sidebands from transmitters T1 through T6 are phase modulated during the frequency sweep due to the difference in propagation path between the master transmitter and the slave transmitters. In addition there is a phase modulation (Doppler modulation) due to changes in the aircraft path length difference between the master transmitter and the slave transmitters, produced by aircraft motion.

In the analog signal conditioner, pairs of phase modulated intermediate frequency signals, one pair from each slave transmitter T1 through T6, is converted to its average frequency. This average frequency signal is identical to that which would have been received had the slave transmitters T1 through T6 been transmitting at the master transmitter frequency. Excluding the phase modulation described in the paragraph above, the seven signals are at the same frequency and a valid phase comparison can be made between these signals to extract the phase modulation; this phase comparison is done in the phase-to-digital converter.

In the digital signal processor, the digitized phase difference information (digital words) from the phase-to-digital converter are stored in memory and processed to obtain the desired aircraft position and velocity data. Five successive samples of the differential phase are operated on to yield a single absolute unambiguous value of path length difference between two transmitter stations and the landing aircraft. Absolute path length difference measurements are averaged to reduce errors and are updated to provide samples of the present positions of the aircraft in real time. Successive digital words, at the same plateau frequency, are subtracted to obtain "backward differences" for measuring the rate of change of the path length difference produced by aircraft motion.

The digital signal processor also transforms the aircrafts position and velocity, measured in a hyperbolic coordinate set, into a more convenient runway referenced Cartesian coordinate set.

In addition, in the digital signal processor, the aircraft's real time position is compared with the desired aircraft position as determined by an internally stored landing trajectory and/or by the ground controller. The resulting error signals are used by the autopilot and engine controller to accurately guide the aircraft along the desired flight path. The result is a closed loop guidance system in which the aircraft is directed along a predetermined landing trajectory, and is directed to be at a predetermined position on the trajectory at a given instant of time. This results in a landing sequence which can be optimized to obtain maximum runway utilization.

Additional features of the aircraft landing system are a two-way high capacity air/ground communications link also operating in the X-band portion of the spectrum. The ground to aircraft communications link delivers voice and digital messages to the aircraft and provides frequency acquisition, and sweep assist voltages to the airborne superhetrodyne phase-locked-loop receiver. The aircraft to ground communications link sends voice messages to the ground controller, and digital aircraft identification and aircraft position information for use by the ground computer.

The landing system provides redundant aircraft position signals to the landing aircraft. This permits the aircraft computer to continuously compare the measured positions of the aircraft via independent channels, thus maximizing system confidence. In the event of failure of any one channel, the airborne signal processor can immediately sense the failure and prevent the failed channel's information from being used in the calculation of aircraft position.

The system of this invention provides the maximum possible volumetric coverage consistent with fundamental interferometer system limitations. Horizontal (azimuthal) coverage extends seventy degrees either side of the runway centerline in both the approach and roll-out (missed approach) sectors. Vertical coverage normally extends from one to thirty degrees in the approach sector. Vertical coverage can easily be extended to the missed approach sector. The range limitation is primarily determined by transmitter power and by signal attenuation produced by intense rainfall. A design range of thirty miles is obtainable with a transmitter power of about one hundred watts per channel, under moderate rainfall rates.

The system can have a modular building block construction which permits several classes of service. The highest level of service is a completely automatic mode with the air crew monitoring the aircraft's landing trajectory. Reduced levels of service are achievable with reduced or less sophisticated airport and/or aircraft equipment. These service levels require the pilot to control the aircraft continuously using system displays until other visual navigation aids can be used to complete the landing. The system has sufficient versatility to satisfy the needs of the large civilian airport as well as the requirement of the military to land on aircraft carriers or small forward airfields. Parallel runway capability is achieved at high density airports by equipping each runway with its own landing system, which is synchronized with other runways at the same airport in order to avoid frequency interference.

The above and many other objects, features, and advantages of this invention will become apparent from the ensuing description of a preferred embodiment, when considered in conjunction with the accompanying Drawing.

DETAILED DESCRIPTION OF A PREFERRED EMBODIMENT

Figure 1:
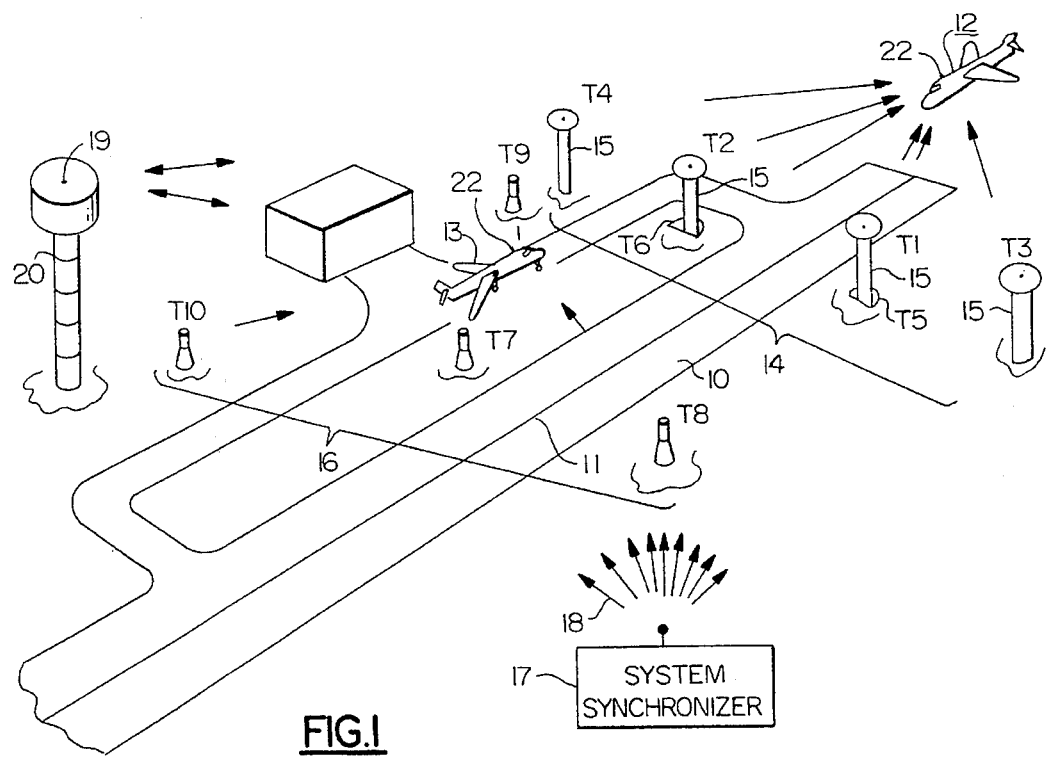
FIG. 1 is a schematic perspective of an airport showing a precision aircraft guidance system according to this invention.
Figure 1A:
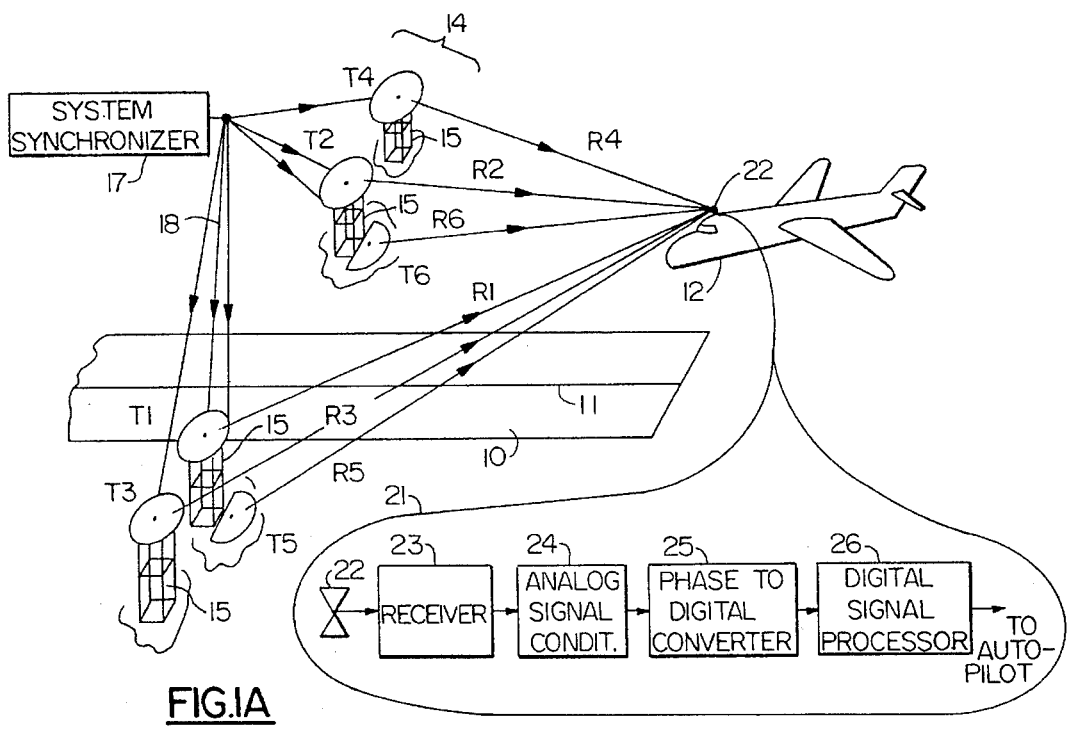
FIG. 1A is a partial schematic view including details of the precision landing system positioned about a runway and a block diagram of the aircraft's landing system electronics.

With reference to the Drawing, and initially to FIGS. 1 and 1A, an airport is shown having a runway 10 with a runway center line 11. An aircraft 12 is aloft and in the process of landing, while another aircraft 13 on the ground is taxiing. A landing array 14 of transmitting antennas T1 through T6 is situated in a line across runway 10 at a predetermined longitudinal position along the runway. The antennas T1 and T2 are positioned atop towers 15 of a predetermined height, for example eighty-three feet, so that the antennas T1 and T2 are at the same predetermined elevation and at predetermined equal distances to the right and to the left of the runway center line 11. The landing array 14 also includes third and fourth antennas T3 and T4, which are situated in line with the antennas T1 and T2, at the same elevation, and spaced by a predetermined lateral distance from the respective antennas T1 and T2. These antennas T3 and T4 are likewise situated atop respective towers 15, so as to be at the same elevation as the antennas T1 and T2. Situated directly below the antennas T1 and T2, but a few feet towards the approach end of runway 10, are fifth and sixth antennas T5 and T6.

Under normal operating conditions, the first and second antennas T1, T2 provide azimuthal information. The first through fourth antennas T1, T2, T3, and T4 combine to provide range information. The first and fifth antennas and the second and sixth antennas T1, T5, and T2, T6 provide elevation information for the approaching aircraft 12.

In addition, there is a taxiing array 16 which includes taxiing antennas T7, T8, T9, and T10. These are azimuthally omnidirectional or sectorial transmitter antennas. They provide a taxiing aircraft 13 with ground position information, so as to prevent ground collisions or running off the taxiway or tarmac onto soft ground.

A system synchronizer 17 sends system synchronizing signals to all of the above-mentioned antennas T1–T10 through a precision fiber optic net 18. This net includes fiber optic cables cut to precise lengths and path length stabilized to ensure phase coherency. Also shown is a two-way communications subsystem 19, mounted on airport tower 20 (or alternately one of the towers T1 or T2) which communicates over X-band radio frequencies to exchange voice communications and data between the aircraft 12 and 13 and the airport traffic control facility.

As shown in FIG. 1A, the aircraft 12 and 13 each include on-board receiver/signal processors for receiving and processing the continuous wave signals emitted by the transmitting antennas T1 through T10. Here the receiver includes an antenna 22 which supplies the received radio frequency signals to a superhetrodyne phase-locked-loop receiver 23 which is followed by an analog signal conditioner 24. The analog signal conditioner supplies a signal from each ground transmitter to a phase-to-digital converter 25 which measures the phase difference between the signals received from the pairs of ground transmitters. This is followed by a digital signal processor 26. The latter develops azimuth, range and elevation information according to the principles discussed in the following paragraphs. This information can be displayed to a pilot for landing the aircraft 12, but can preferably be furnished to an autopilot system or an automatic landing system. The digital signal processor can also output accurate aircraft position information to a transmitter which can then relay the same to the air traffic control facility at the airport.

In addition, the digital signal processor provides a taxiing pilot with his exact position on the airport surface.

Figure 2:
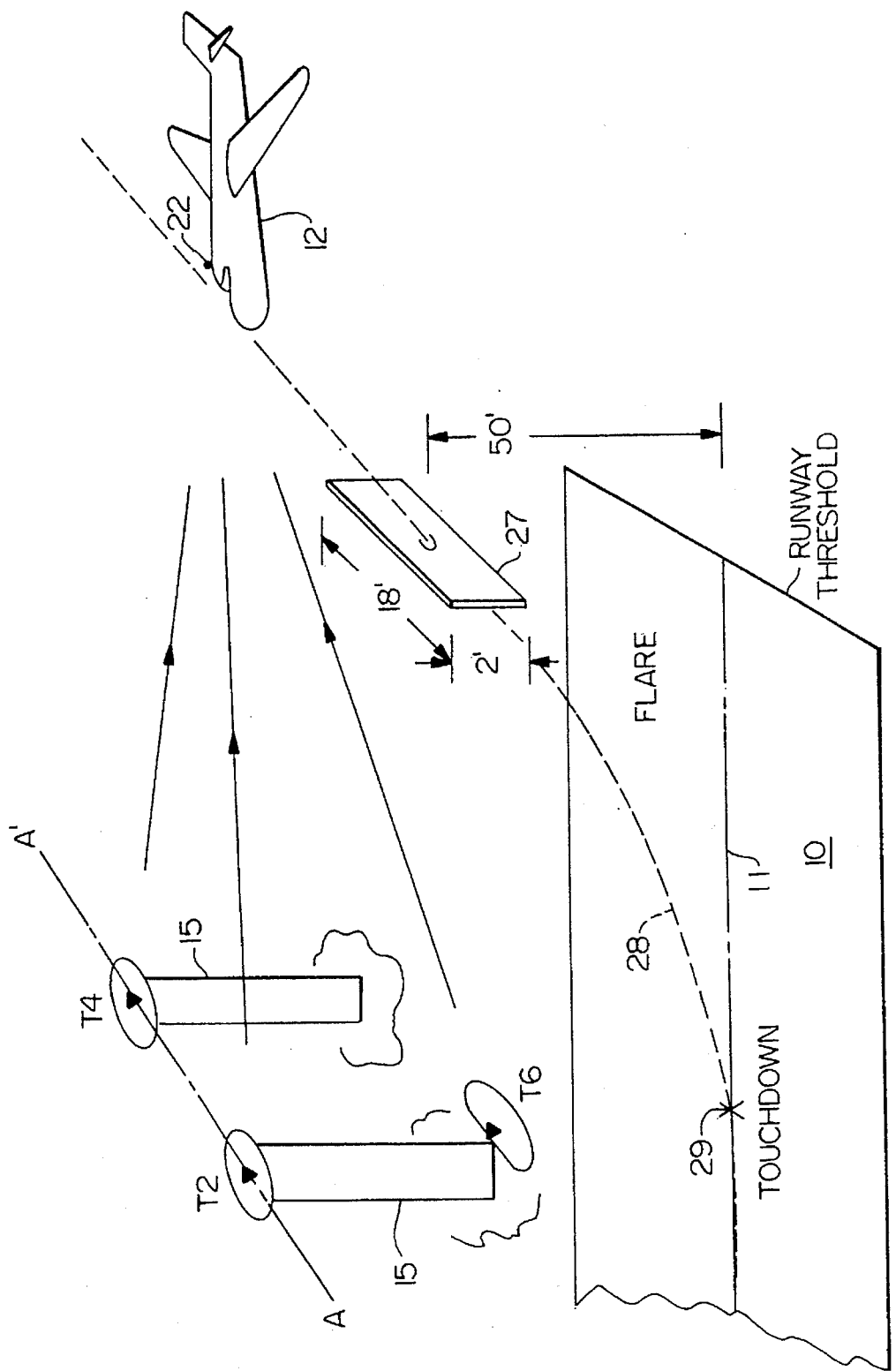
FIG. 2 is a partial schematic view illustrating a landing trajectory for an aircraft exercising the landing system of this invention.

The Category 3C landing accuracy requirement currently recommended by the Federal Aviation Administration is illustrated in FIG. 2. This requirement states that the approaching aircraft 12 must be accurately guided by the landing system along a path (shown in dotted lines) through an approach window 27, which, at a position fifty feet above the threshold end of the runway, is a rectangle two feet in height and eighteen feet in width, centered over the runway centerline 11. From this point, the aircraft 12 is guided through a flare portion of the trajectory 28 to a touchdown position 29 where the aircraft wheels contact the runway 10. To accomplish a safe landing extremely accurate real time azimuth, range and elevation information must be available in the aircraft. This information is extracted from the phase relationship of the signals received from the transmitting antennas of which only the right side transmitters T2, T4 and T6 are shown in FIG. 2.

Azimuth or Lateral Position—Landing

Figure 3:
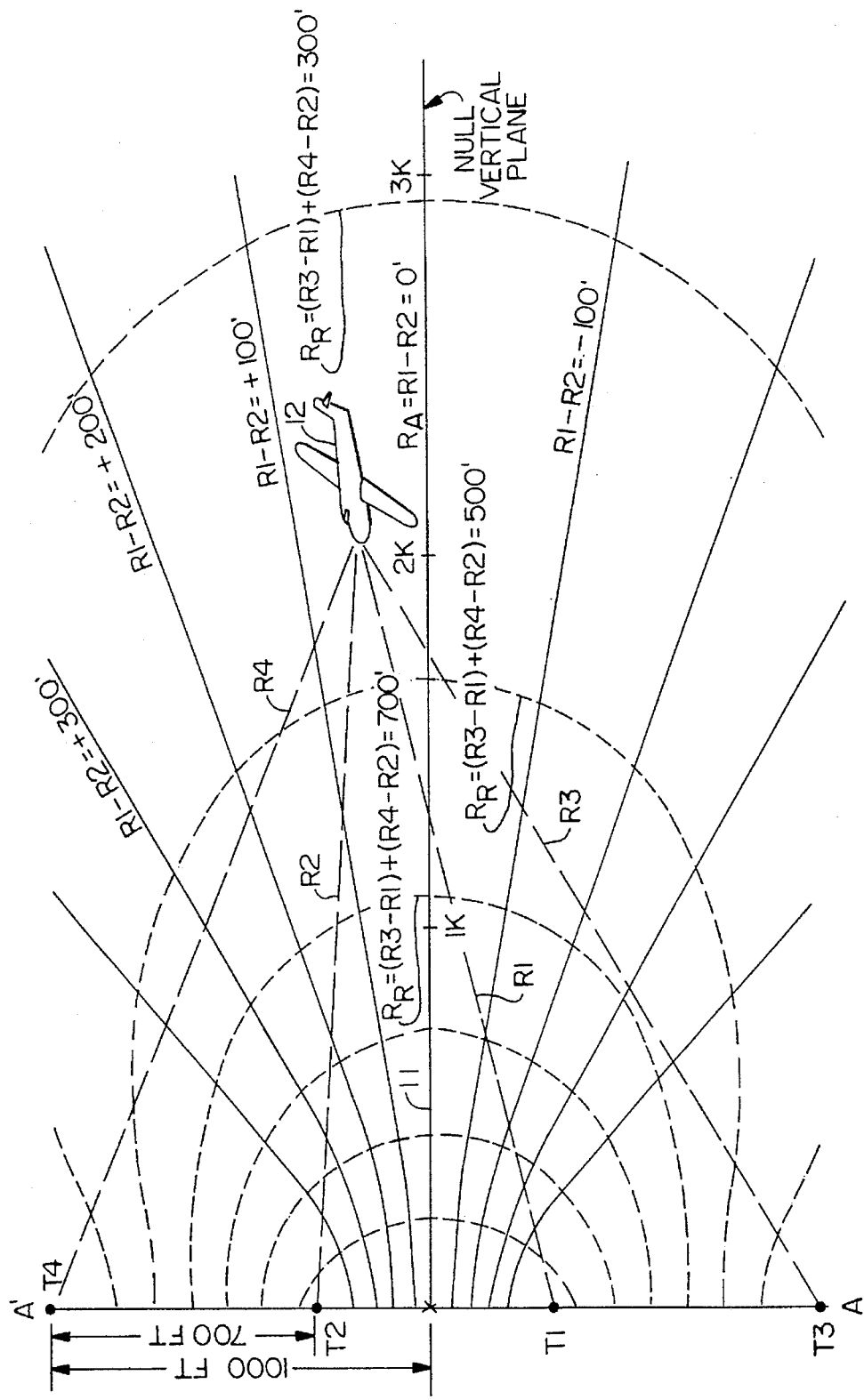
FIG. 3 is a chart for explaining the determination of azimuth and range according to the principles of this invention.

The basic azimuthal service provides continuous aircraft position information with respect to a null vertical plane which passes through the runway centerline 11. With reference to FIG. 3, it can be seen that the null vertical plane is the locus of all points in which the azimuth path length difference between corresponding pairs of antennas, e.g. T1 and T2, is zero. Azimuthal position information received in the aircraft 12 corresponds to the path length difference measurements between transmitter antennas T1 and T2. Here, the distances from the aircraft to the respective antennas T1 and T2 are presented as radii R1 and R2. The locus of all points with a given path length difference produces a given hyperbola of revolution about the axis defined by the line or axis A—A' that passes through transmitters T1 through T4. This axis A—A' is also perpendicular to the null vertical plane. These loci develop a family of hyperbolas of revolution, represented as solid lines in FIG. 3 with each path length difference $R_A = (R1-R2)$ representing a given deviation from the null vertical plane. The azimuthal path length difference, $R_A = (R1-R2)$, is computed in the aircraft based on the phase differences in the signals received from the two antennas T1 and T2. This is then used for azimuthal guidance, either directly or as combined with elevation and range information, to compute the three dimensional position of the aircraft 12.

Range—Landing

The range of the aircraft 12 relative to the antenna axis A—A' can be obtained by measuring the respective path length difference to the pairs of antennas T1 and T3, and T2 and T4 on each side of the runway centerline 11. These appear as path length differences (R3–R1) and (R4–R2). The sum of the two path length differences $R_R = (R3-R1) + (R4-R2)$ serves as a measure of range or distance from the antenna axis A—A'. Each given value of path length difference $R_R$ corresponds to a locus of points with a given range value as shown in dashed lines in FIG. 3.

While shown in one horizontal plane in FIG. 3, the dash lines of constant path length difference can be visualized as being rotated about the antenna axis A—A' to form surfaces of equal path length differences. The curves for successive equal increments of $R_R$ become more closely spaced as these approach the axis A—A'. Thus, there is an increased range accuracy as the aircraft 12 approaches the touchdown point 29.

Elevation—Landing

Figure 4:
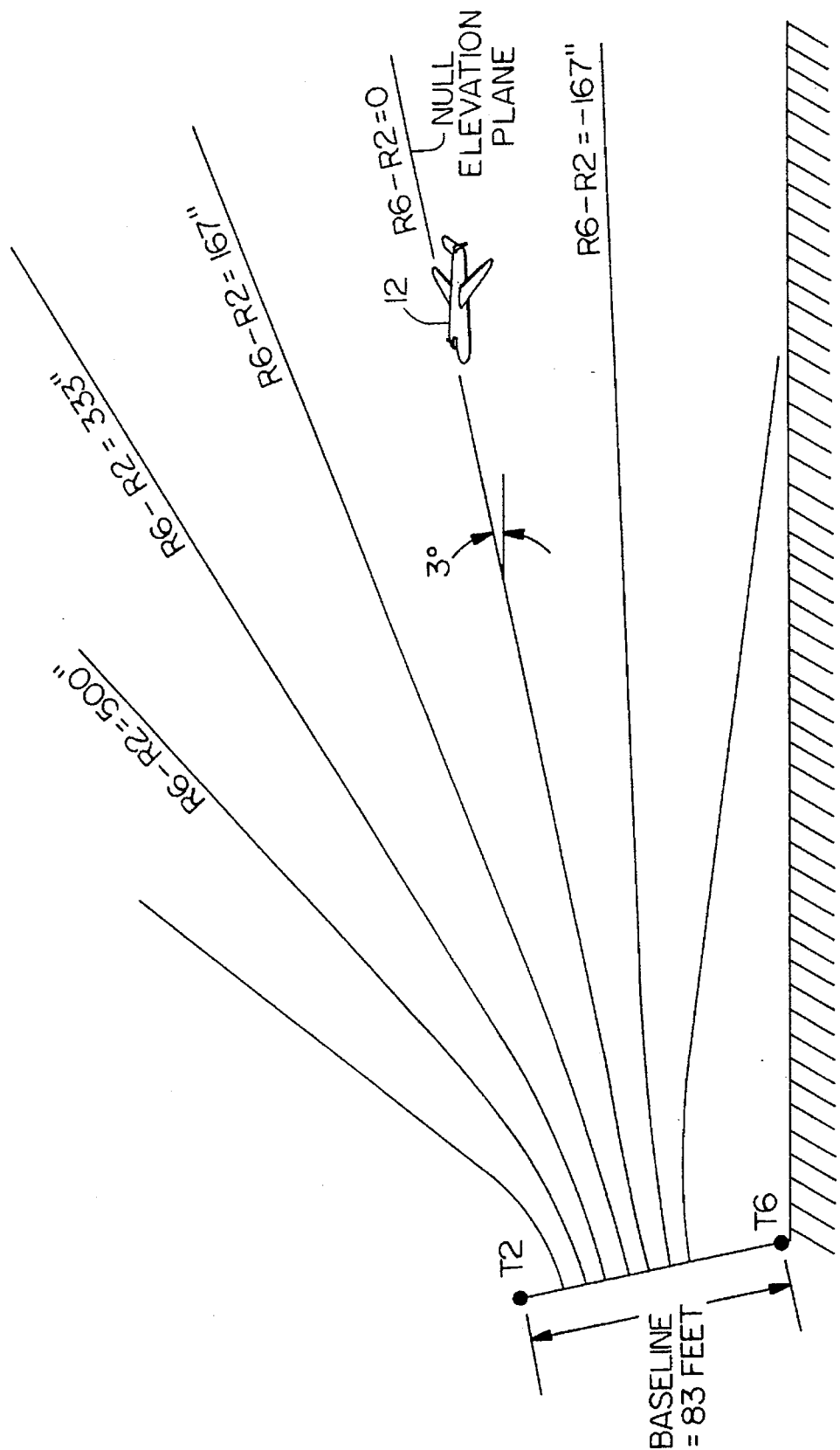
FIG. 4 is a chart showing the hyperbolic lines of position about a baseline T2, T6 which is used to obtain elevation position information.
Figure 5:
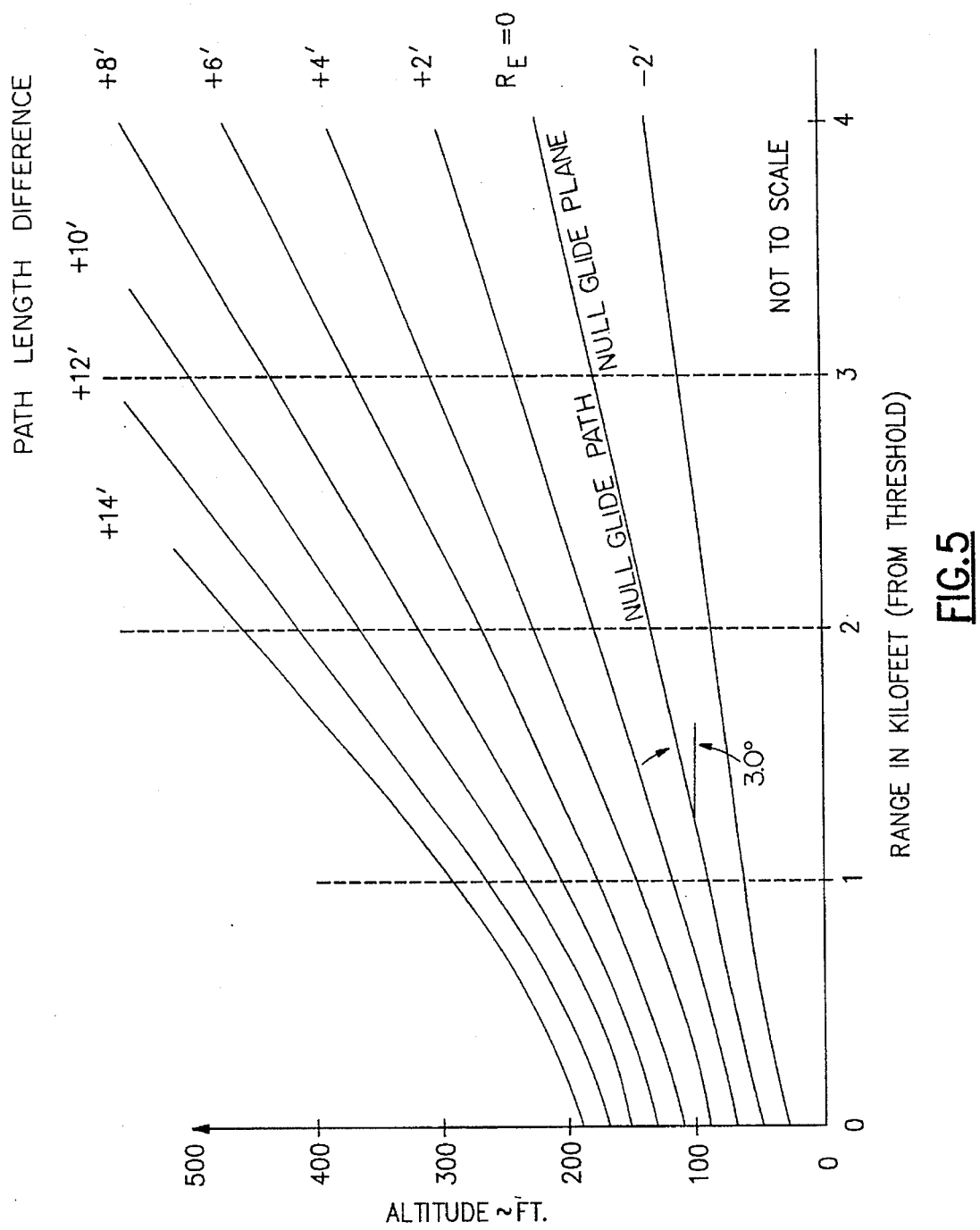
FIG. 5 is a chart showing the intersection of the vertical null plane with the elevation hyperbolic surfaces of revolution about the baseline T2, T6. Each intersection line represents the loci of all points which have a given valve of elevation path length difference.

Basic vertical information is provided in terms of continuous proportional up and down path length difference information, relative to a null elevation plane, which can be explained with reference to FIGS. 4 and 5. Here the aircraft 12 processes information (R6–R2) and (R5–R1) corresponding to the path length difference from pairs of antennas T6, T2 and redundantly T5, T1. As illustrated, transmitter antenna T2, which is positioned atop the tower 15, and the antenna T6, which is positioned on the ground and a short distance towards the approaching aircraft, define an interferometer baseline of 1000 inches (or about 83 feet). This baseline is tilted back by about 3° relative to the runway plane and the null elevation plane intersects the baseline at its midpoint. This null elevation plane is defined as the locus of points of zero path length difference, i.e., (R6–R2)= 0. The locus of all points with a given measured path length difference, $R_E = (R6-R2)$, defines a hyperbola of revolution about the baseline that connects the two antennas T6 and T2. What is illustrated in FIG. 5 is the intersection of this family of elevation hyperbolas of revolution with the null vertical plane. The line defined by the path length differences $R_A = 0$ and $R_E = 0$ is considered a null glide path. The null glide path is a line directly above the runway centerline and at an elevation angle of 3°.

Three Dimensional Fix—Landing

The landing aircraft 12 measures the path length differences, $R_A$, $R_R$, $R_E$, between itself and selected ground stations. Measurements of $R_A$ and $R_R$ permit the aircraft to calculate its position on the azimuth-range plane. This defines a circle about the A—A' axis in three-dimensional space. Then, measurement of $R_E$ defines a hyperbola of revolution about the elevation baseline. The intersection of this elevation hyperbola of revolution with the azimuth-range circle produces a three dimensional fix. This fix can be computed using standard mathematical techniques.

Redundancy—Landing

The six transmitting antennas used in the landing of the aircraft permit redundant measurements of the aircraft position. For example, azimuth data may be supplied by antennas T1 and T2 or by antennas T3 and T4; elevation data may be supplied by antennas T5 and T1 or by antennas T6 and T2. Range data may be supplied by any three of the antennas along the axis A. This redundancy is used in the airborne receiver/signal processor to provide a real-time check of the quality of the aircraft fix and provides the pilot with the confidence required to land the aircraft under poor visibility conditions.

Taxiing

Transmitting antennas T7 through T10 provide an aircraft on the ground with its instanteous position by measuring path length differences between pairs of antennas to obtain a two dimensional fix on the airport surface, using the same interferometry principles described for the landing aircraft. In the configuration shown, antenna T7 would be the taxiing master antenna, and antennas T8, T9, and T10 would be slave antennas.

Path Length Difference Measurement

Figure 6A:
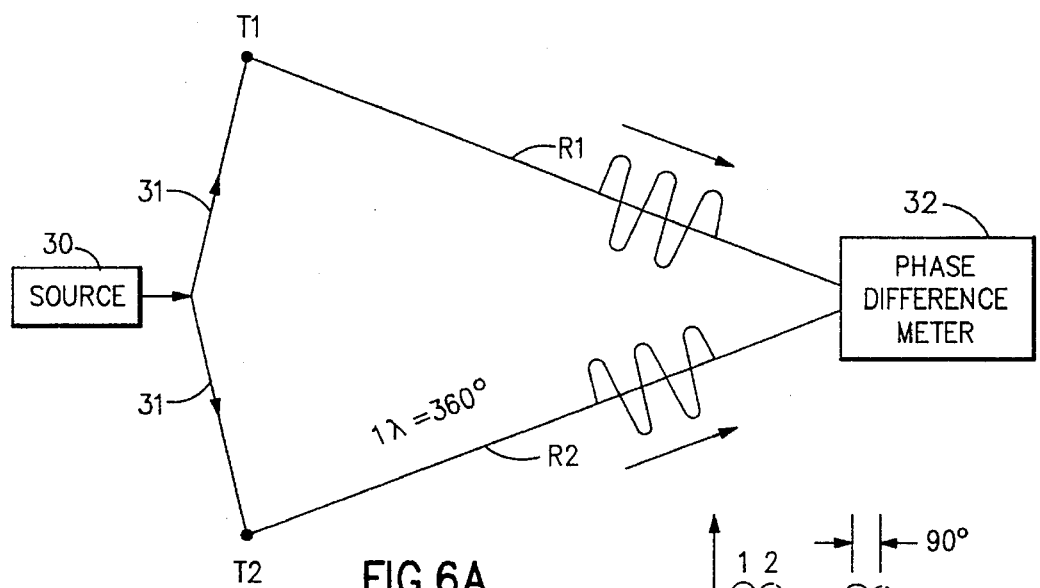
FIGS. 6A and 6B are a schematic view and a chart of a wave for explaining the radio interferometry principles employed in this invention.

In the aircraft, the measurement of each path length difference is based upon a precise phase difference measurement between signals received from a pair of ground antennas. For example, FIG. 6A illustrates a phase difference measurement.

Figure 6B:
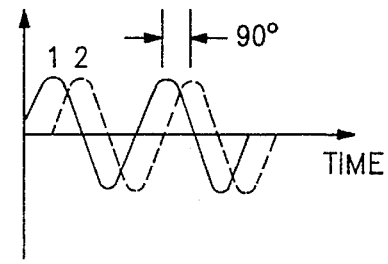

The signals received from the X-band transmitters T1 and T2 are used to calculate the difference in path length R1 and R2. In this case, the signals emanate from a common source 30, which is connected to the transmitting antennas T1 and T2 over precision-cut path-length stabilized fiber optic cables 31 so that the signals are in identical phase relationship when received at antennas T1 and T2. At antennas T1 and T2 the optical signals are coherently transformed to radio frequency (rf) signals and then radiated to the aircraft via path lengths of radii R1 and R2. In the aircraft, the phase difference between the two received signals is measured by the phase difference meter 32. Shown in FIG. 6B are the waveforms 1 and 2 received via path R1 and R2 respectively where R2 is larger than R1 by one-quarter wavelength. In X-band, with a wavelength of one inch, this would correspond to a path length difference of one-quarter inch. In practice, the phase meter 32 can measure phase difference to an accuracy of a few degrees which corresponds to path length differences of a fraction of an inch. The simple phase measurement illustrated in FIGS. 6A and 6B is not able to distinguish path length differences which are multiples of one wavelength and consequently can not be used by itself to measure the absolute unambiguous value of the path length difference (R1–R2). However, it is used to measure accurately the changes in path length difference which occurs from one time to another.

In order to measure the absolute value of the path length difference, (R1–R2), i.e. without ambiguities at integral multiples of one wavelength, a frequency modulation of the transmitted signals from the ground to the air is utilized. Illustrated in FIG. 7A, the frequency modulated signal alternately sweeps between an upper plateau frequency 33 and a lower plateau frequency 34 with a period T, shown as 35, of about 50 msec or a repetition frequency of 20 Hz. The upper plateau frequency is about 250 MHz above the center frequency $f_c$ and the lower plateau frequency is about 250 MHz below the center frequency $f_c$. The frequency sweep from the lower to the upper plateau frequencies 36 is given by the formula:

$$f_{MHz}(t) = [250]\left[ -1+\frac{32}{3P^3}\left\{ (t^3U(t)) - 2\left(t-\frac{P}{4}\right)^3 U\left(t-\frac{P}{4}\right) + 2\left(t-\frac{3P}{4}\right)^3 U\left(t-\frac{3P}{4}\right) - (t-P)^3 U(t-P) \right\}\right]$$

where P is the time to sweep between the lower to upper plateau frequency, about 15 msec and U(t) is a unit step at time t=0. A similar transition is used between the upper and lower plateau frequencies. The smooth transition between the plateau frequencies is designed to minimize the phase tracking error in the phase-locked-loops which must track the frequency deviations.

Figure 7A:
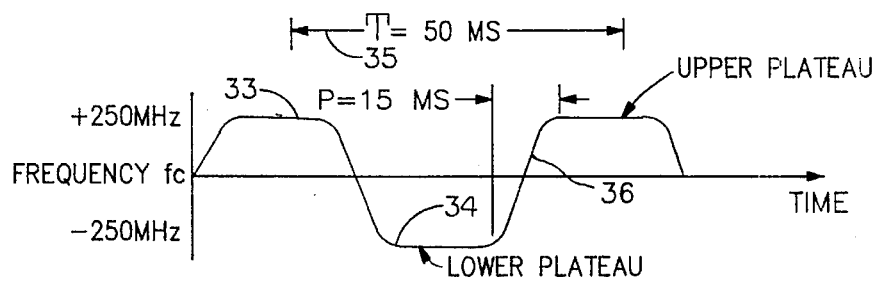
FIGS. 7A, 7B, and 7C are wave charts for respectively showing the details of the frequency modulated rf signal employed in an embodiment of this invention, the patterns of phase from two respective antennas, and the resulting phase difference.
Figure 7B:
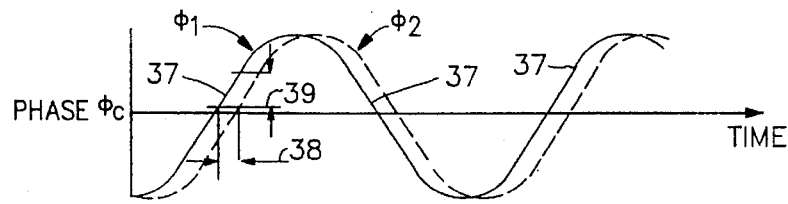

Shown in FIG. 7B are the phase excursions which correspond to the frequency modulation of FIG. 7A. Since phase is the integral of frequency with respect to time, i.e., $\phi = k\int fdt$, the plateau frequencies in FIG. 7A are represented as lines of constant slope 37 in FIG. 7B.

Figure 7C:
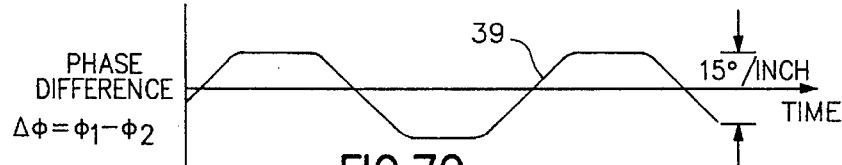

In order to illustrate the technique used for unambiguously measuring the path length difference R1–R2, assume that the signal received at the aircraft via path R1 is represented as $\phi 1$, the solid line in FIG. 7B. In like manner the signal received via path R2 is represented as $\phi 2$, the dotted lines. Signal $\phi 2$ is delayed by a time difference 38 relative to $\phi 1$ by the additional propagation path of R2, i.e., R2> R1. FIG. 7B shows the phase difference $\Delta\phi=(\phi 1-\phi 2)$ 39, as a function of time. This is also illustrated in FIG. 7C where the phase difference $\Delta\phi=(\phi 1-\phi 2)$, shown as 39 in FIG. 7B, is plotted as a function of time. For the frequency deviation of ± 250 MHz, the phase difference has a peak-to-peak deviation of 15° per inch of path length difference. Reversal of the sign of the phase difference waveform of FIG. 7C indicates that R1> R2.

Figure 7D:
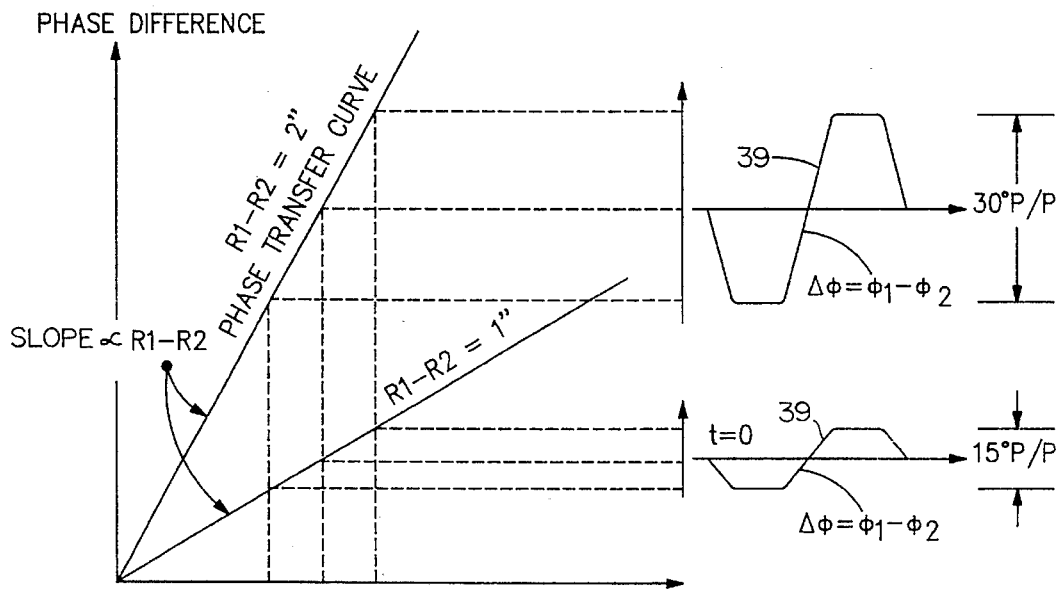
FIG. 7D is a chart for explaining the relation of path length difference to phase difference wave amplitude.
Figure 7D:
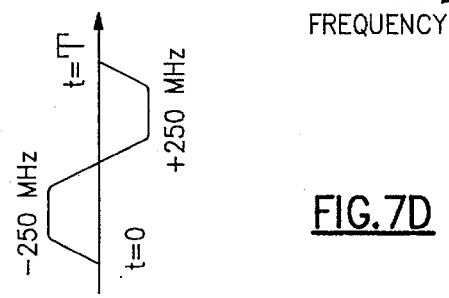

Illustrated in FIG. 7D are the phase excursions experienced by path length differences of one inch and two inches due to the frequency deviations of ± 250 MHz.

Airborne Electronic Equipment

Figure 8A:
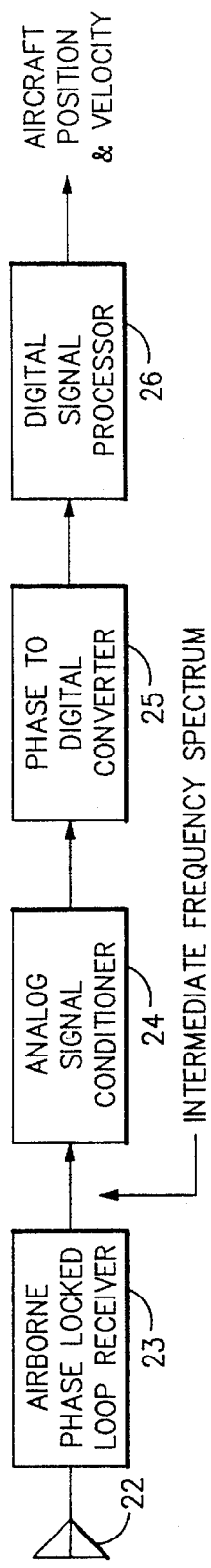
FIG. 8A is a simplified block diagram to show the signal flow through the airborne electronic equipment.

Shown in FIG. 8A are the major airborne electronic components used to extract the instanteous position and velocity of the aircraft.

Figure 8B:
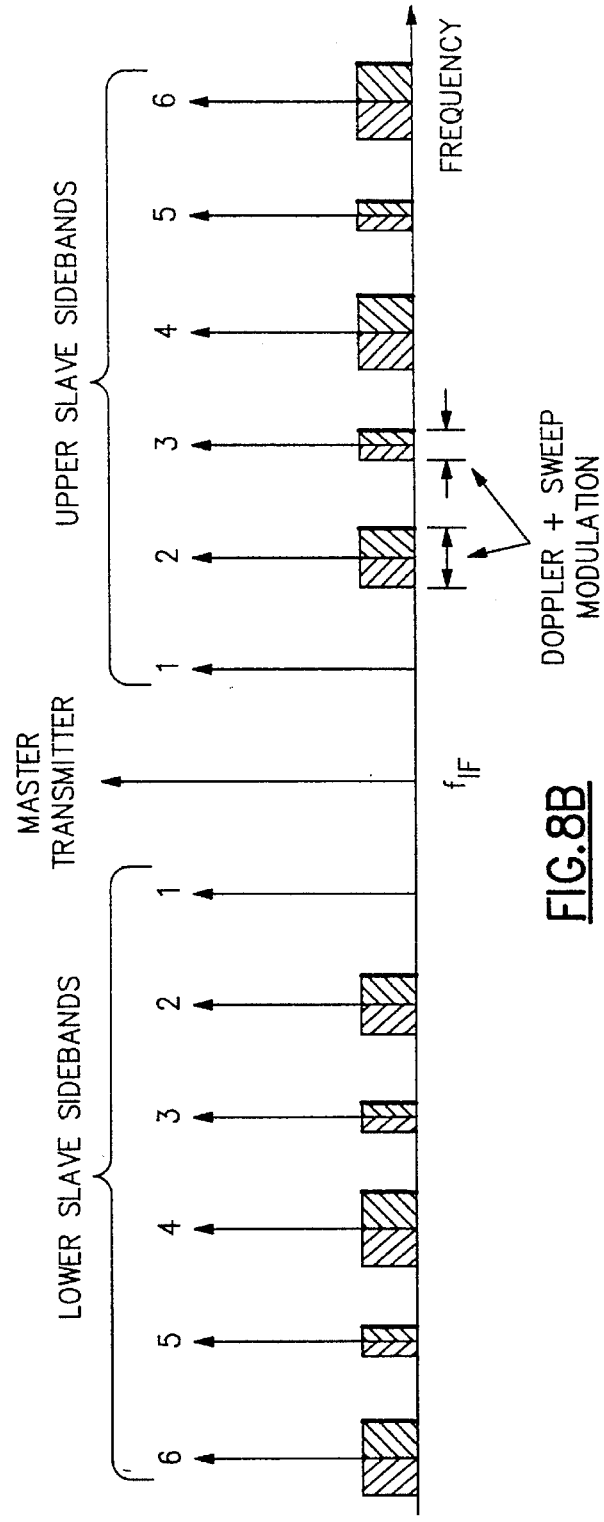
FIG. 8B is the intermediate frequency spectrum in the airborne phase-locked-loop receiver.

The phase-locked-loop receiver 23 phase locks to the master transmitter signal and produces an intermediate frequency spectrum in which pairs of sidebands, one pair from each ground transmitter, are transmitted to the analog signal conditioner. Each pair has a phase modulation produced by the path length difference between the master transmitter and the slave transmitter and by the change in path length difference produced by aircraft motions. FIG. 8B is an intermediate frequency spectrum. The master transmit signal is at the center of the spectrum and the pairs of sidebands from the slave stations are symmetrically positioned above and below the master transmit frequency. The hashed areas represent the phase/frequency modulation which is produced by the frequency sweep and by aircraft motion.

The analog signal conditioner 24 accepts the intermediate frequency pairs of sidebands from each slave transmitter and generates a signal which is at the average phase/frequency of the two sidebands. The outputs of the analog signal conditioner comprises seven signals, respectively originating in each slave transmitter plus the master transmitter signal. All signals are at the same nominal frequency as the master transmitter intermediate frequency signal. The path length difference and change of path length difference between the master and slave stations are represented as variations in phase. The six slave signals represent path length differences (R0–R1), (R0–R2), (R0–R3), (R0–R4), (R0–R5) and (R0–R6) where R0 is the distance between the master antenna and the aircraft. The phase-to-digital converter accepts the six outputs from the analog signal conditioner and continuously counts the phase difference between selected pairs of these signals as a function of time. The phase-to-digital converter is a special reversible counter specifically designed to make a continuous count of phase difference and which is sampled in real time during the upper and lower plateau periods. As an example, in order to extract the azimuthal path length difference, (R1–R2), a phase to digital converter would accept the two signals (R0–R1) and (R0–R2) and count the phase difference between these two signals which corresponds to (R1–R2). The reversible counter has a least significant bit of 1.4 degrees which represents about 0.1 inches of path length difference.

The digital signal processor 26 performs several mathematical calculations to extract the position and velocity data from the phase-to-digital converter digital words. These calculations are:

1. Transversal Filtering—Extracting the absolute value of path length difference between any two transmitters and the aircraft. (Absolute value of path length difference refers to a magnitude of path length difference, either positive or negative, which does not have ambiguities at multiples of one wavelength).

2. Updating—Projecting the absolute value of path length difference at the output of the transversal filter to a future time.

3. Averaging—Finding the average value of several updated outputs of the transversal filter which have been updated to a common time. This averaging significantly reduces the random error associated with a single transversal filter output word.

4. Updating Average—Projecting the averaged path length difference to any future time. Because updating is relatively immune from multipath induced errors, it is advantageous to use the updated average during guidance periods when large multipath signals can be expected.

5. Coordinate Transformation—Transforming the hyperbolic path length difference measurements to a runway centered Cartesian coordinate system.

6. Aircraft Position Error—Calculating the difference between the present aircraft position and the desired aircraft position which has been transmitted to the aircraft from the flight controller via the communication link or which has been stored in internal memory. This error and the aircraft velocity are used by the autopilot to guide the aircraft along the desired trajectory.

7. Velocity—Calculating changes in path length difference during one period T, 35, by sampling the reversible counter at the beginning and end of this period, by subtracting the two readings and then dividing by the period. The change in azimuth, range, and elevation path length differences during one period can be combined to calculate the aircraft velocity vector. The aircraft velocity vector can be used to enhance the performance of the closed-loop feedback system which automatically guides the aircraft.

A more detailed description of each of the functions performed by the digital signal processor is given below.

Transversal Filter

Figure 9A:
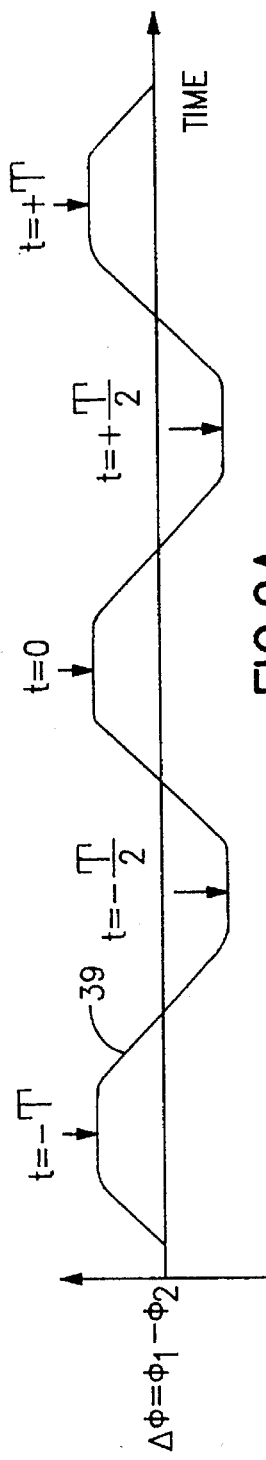
FIGS. 9A and 9B are a wave chart and a schematic block diagram for explaining a transversal weighted filtering technique.
Figure 9B:
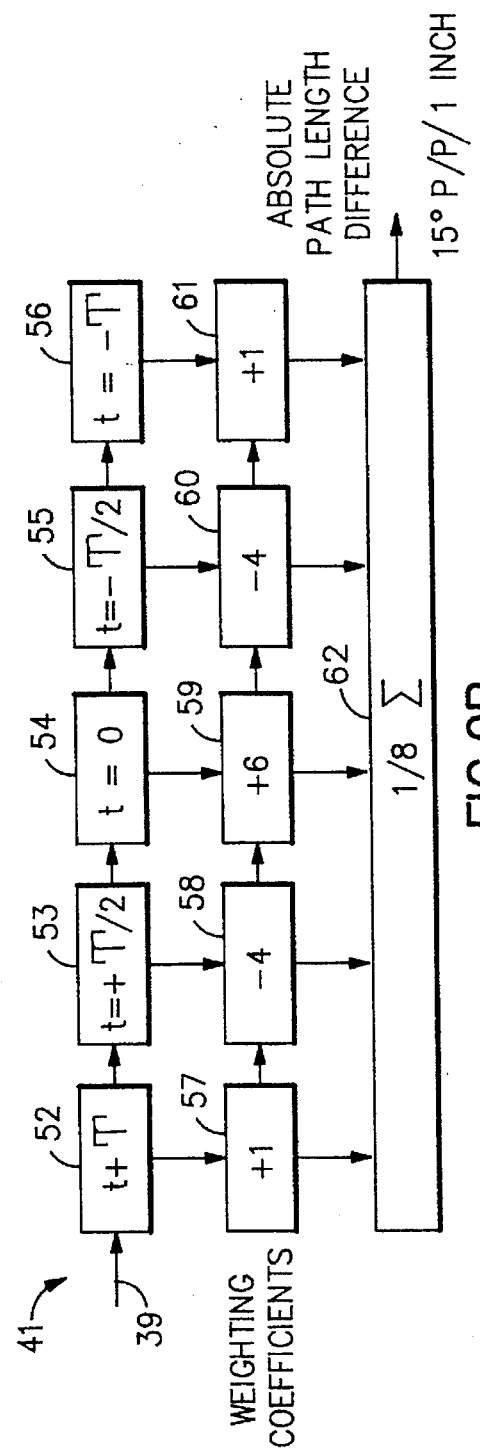

The signal processing arrangement required to extract the absolute unambiguous value of path length difference is configured as a transversal filter as explained with reference to FIGS. 9A and 9B. The phase difference signal 39, of FIG. 9A, and of FIG. 7C is fed through a series of five delay stages 52, 53, 54, 55, 56 in the transversal filter, each of which delays the signal by a time T/2 where T is the period (50 ms) of the modulating signal. At times corresponding to the upper and lower plateau frequencies each of the delay stages is sampled. Each sample represents the value of $\Delta\phi=(\phi 1-\phi 2)$ at the following times:

$$t = T, +\frac{T}{2}, 0, -\frac{T}{2}, -T$$

These samples are multiplied by the weighting coefficients 57, 58, 59, 60, 61 whose values +1, −4, +6, −4, +1 respectively are selected so that errors due to aircraft motion are minimized. The weighted values of $\Delta\phi=(\phi 1-\phi 2)$ are then summed and normalized by dividing by eight in the computational circuit 62. For each five input samples, the transversal filter produces one sample of absolute path length difference referenced to time t=0, the central point of the five samples and which has a scaling factor of fifteen degrees peak-to-peak per inch of absolute path length difference.

In practice the transversal filter is implemented using digital techniques. The time delay would be introduced using digital memory and the arithmetic calculations are implemented in a digital computer.

Updating

Figure 10:
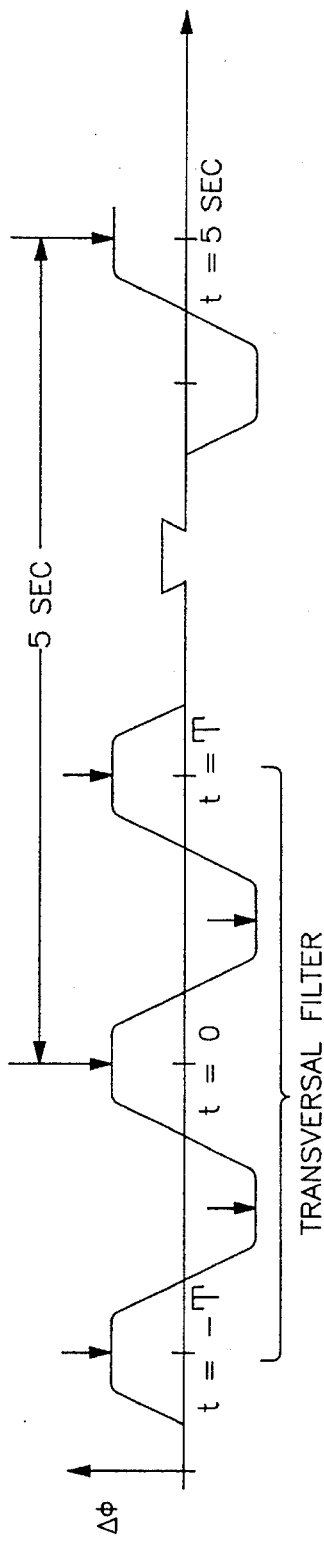
FIG. 10 is a chart explaining the updating of measured values of absolute path length difference to future times.

The value of absolute path length difference measured at time t= 0 by the transversal filter may be updated to any future time by measuring the change in the phase difference signal $\Delta\phi=(\phi 1-\phi 2)$ which has occurred during a given time interval. In FIG. 10 the value of absolute path length difference measured at time t= 0 is updated to time t= 5 sec. In this example, both the absolute value of path length difference at t= 0 and the updated absolute path difference at t= 5 sec are measured at the upper plateau frequency. The absolute path length difference at time t= 5 sec is then computed by the formula:

$$PLD(t = 5 \text{ sec}) = PLD(t = 0) + \left[ \frac{\lambda u}{360°} \right] [\Delta\phi(5) - 66\phi(0)]$$

$$[\text{inches}] = [\text{inches}] + \left[ \frac{\text{inches}}{\text{degree}} \right] [\text{degrees}]$$

where $\lambda\mu$ is the wavelength of the master transmitter in inches during the upper plateau period.

Averaging

Figure 11:
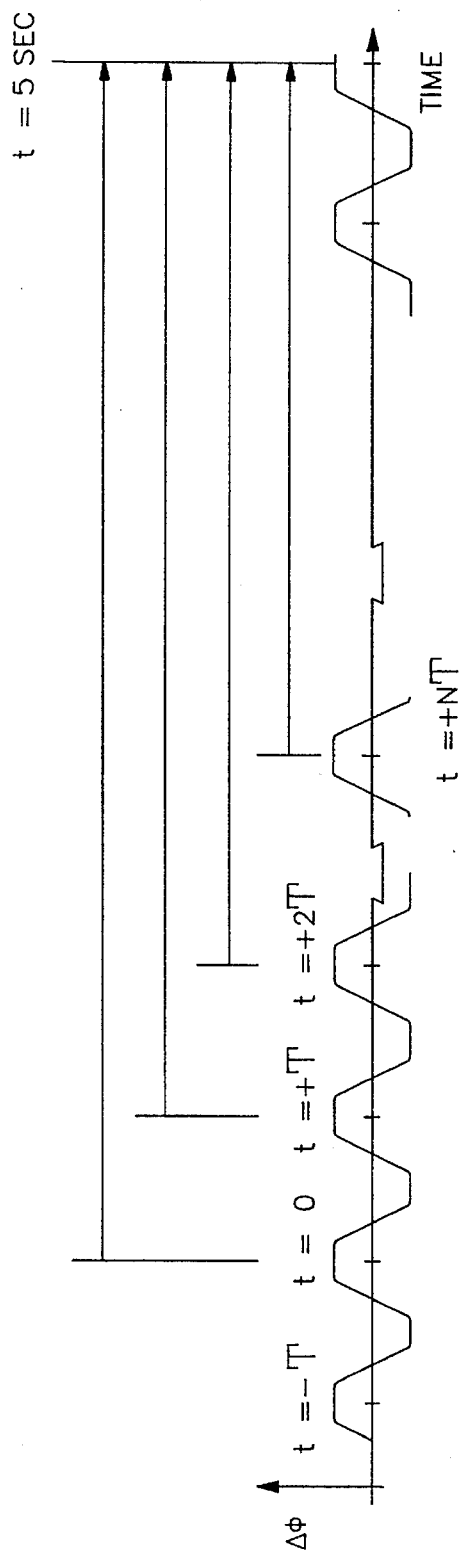
FIG. 11 is a chart explaining the averaging technique in which numerous path length differences are all updated to a common future time and averaged to reduce their error content.

The updating technique may be used to average a large number of samples of absolute path length difference to a common future time. FIG. 11 shows the updating applied to 100 samples of absolute path length difference such that all samples are updated to t= 5 sec. All 100 updated samples are then averaged to obtain the average absolute value of path length difference at time t= 5 sec. The averaging formula in this illustration is:

$$\overline{PLD}(t=5) = \frac{1}{100} \sum_{N=0}^{99} \left\{ PLD(t=NT) + \left[ \frac{\lambda u}{360°} \right] [\Delta\phi(5) - \Delta\phi(t=NT)] \right\}$$

$$[\text{inches}] = [\text{inches}] + \left[ \frac{\text{inches}}{\text{degree}} \right] [\text{degree}]$$

Averaging significantly reduces the random errors contained in each of the one hundred samples. For one hundred independent samples, the error is reduced by the square root of the number of samples, i.e., by a factor of ten.

The process of updating numerous individual samples of absolute path length difference to a common time may be visualized as generating a "sliding window" filter.

Updated Average

The updated and averaged value of absolute path length difference which has minimal error may also be updated to any future time. This concept becomes important during the landing maneuver when multipath propagation becomes the dominant path length difference error and the individual samples of absolute path length difference may be expected to contain large errors. This would normally occur at low altitudes near touchdown and continue through roll-out. During this period, updated values of averaged absolute path length difference can be used for guidance. The equation for this updating is:

$$\overline{PLD}(t) = \overline{PLD}(t-x) + \left[ \frac{\lambda u}{360°} \right] [\Delta\phi(t) - \Delta\phi(t-x)]$$

$$[\text{inches}] = [\text{inches}] + \left[ \frac{\text{inches}}{\text{degree}} \right] [\text{degree}]$$

where PLD(t-x) represents the averaged value of path length difference at a time x seconds in the past. In this example, all samples are taken at the upper plateau frequency.

Coordinate Transformation

In the landing systems described, the aircraft measures its position in terms of the path length difference between selected pairs of ground transmitting stations. These path length differences, in a hyperbolic coordinate set, are transformed to the more useful Cartesian coordinate set referenced to the airport runway using standard mathematical techniques.

Flight Path Errors

The desired flight path for the landing aircraft can be prescribed by the air controller and transmitted to the aircraft via the X-band communications link, and/or stored in the digital airborne computer. The desired flight path may be selected to maximize the rate of aircraft landings that can be safely accommodated on a given runway. The aircraft digital computer can compare the present position coordinates of the aircraft with those of the desired flight path and thereby produce error signals which can be used in the aircraft to generate steering and engine control commands to minimize the flight errors.

Velocity

Figure 12A:
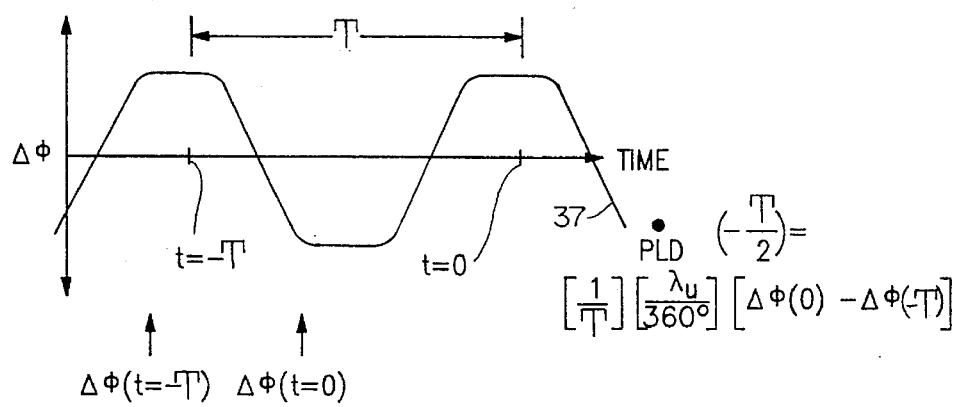
FIGS. 12A and 12B illustrate the sampling of the phase difference waveform to obtain rate of change of path length difference.
Figure 12B:
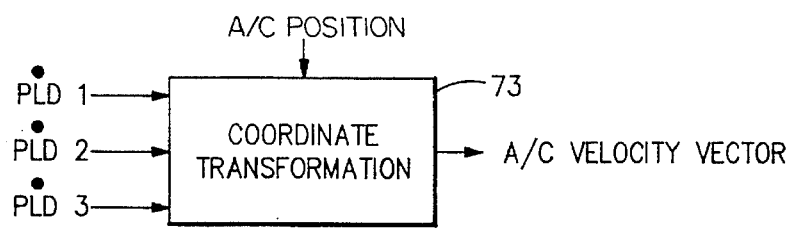

The velocity of the landing aircraft 12 can be computed using the changes in path length difference which have occurred over a time interval of one period, T. In FIG. 12, samples of phase differences $\Delta\phi=(\phi 1-\phi 2)$ are taken at times t= −T and time t= o, both samples being taken at the upper plateau frequency. Then the rate of change of path length difference which has occurred over the interval T, i.e., one period, may be calculated as follows:

$$PLD\left(t = \frac{-T}{2}\right) = \left[\frac{1}{T}\right]\left[\frac{\lambda u}{360°}\right][\Delta\phi(o) - \Delta\phi(-T)]$$

$$\left[\frac{\text{inches}}{\text{sec}}\right] = \left[\frac{1}{\text{sec}}\right]\left[\frac{\text{inches}}{\text{degree}}\right][\text{degree}]$$

where $\lambda\mu$ is the wavelength of the upper plateau frequency.

As each spatial position has three components, so also does velocity, and thus three time rates of change, namely: azimuth, PLD1, (relative to antennas T1 and T2), elevation PLD2, (relative to antennas T2 and T6) and range, PLD3, (relative to antennas T1, T2, T3 and T4) are required to calculate the velocity vector. These three time rates of change, PLD1, PLD2, PLD3, are supplied to the coordinate transformation computer 73 which converts these values into the aircraft velocity vector.

One component of this velocity vector represents aircraft ground velocity. The velocity vector can be used to enhance the performance of the feedback loops that control the aircraft via its autopilot.

Taxiing Guidance

Aircraft maneuvering on the ground can determine their two-dimensional position and velocity using the set of taxiing antennas T7 through T10. These antennas and their associated transmitters operate on the same interferometer principles described in respect to the landing system. Antenna T7 is the master transmitter for the taxiing array of antennas and antennas T7 through T10 are slave transmitters.

Communications Subsystem

The precision measurement subsystem used to determine the position of the aircraft described above has a companion communication subsystem. This subsystem is a ground/air X-band two-way communications link. The ground-to-air link provides both voice and digital communications to the landing aircraft. Besides the normal ground to air voice communications, the link provides the precision measurement subsystem with the desired flight path data, the status of the ground portion of the landing system, acquisition, sweep assist, and timing signals. In addition, the communication link provides the exact location of the phase centers of the array of antennas which are being utilized by the guided aircraft and any error correcting signals which may be necessary. The desired flight path information defines the location of the aircraft as a function of time so that its flight path data may be properly interleaved to accommodate the landings of other aircraft. The status information indicates the operational condition of the landing system, i.e., the quality of the signals being transmitted to the aircraft from the ground. This status information is in part generated by monitoring on the ground a sample of the signal sent to the aircraft utilizing an aircraft type receiver/signal processor with signal quality sensors.

The acquisition signal is represented by the carrier of the communications link and is used to achieve rapid phase-lock of the phase-locked-loop receiver to the incoming swept frequency signal during the plateau frequency interval. The sweep assist signal is a replica of the voltage used to generate the frequency sweep on the ground and is used to provide the majority of the voltage used to drive the local oscillator of the airborne phase-locked-loop receiver during a sweep. The communication links also provides timing signals so that the airborne portion of the interferometer works coherently with the ground station. The ground-to-air link is also used to transmit to the aircraft the location of the landing aircraft itself, the locations of other aircraft using the same runway, and the relative positions of these aircraft to the airport runways and taxiways.

The air-to-ground communications link provides voice communications and digital data representing the identity of the aircraft and its present position to the ground controller and the ground control computer.

Antennas

Figure 13A:
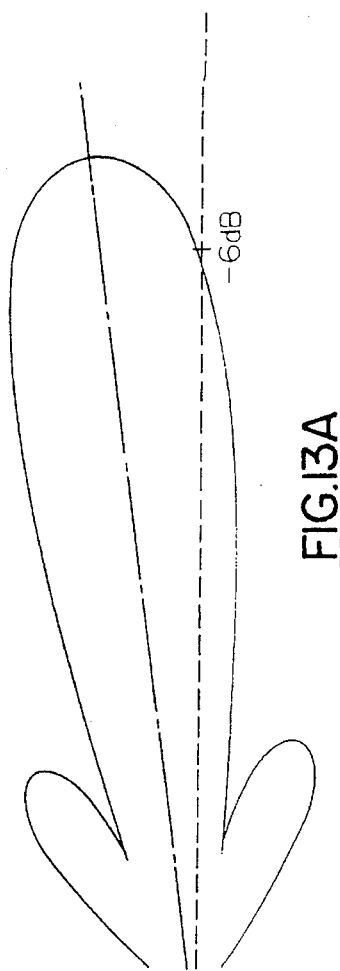
FIGS. 13 and 14 illustrate ground taxiing and landing antennas employed with this invention; with FIGS. 13A and 14A illustrating their characteristic emission lobes relative to the horizontal plane.
Figure 13:
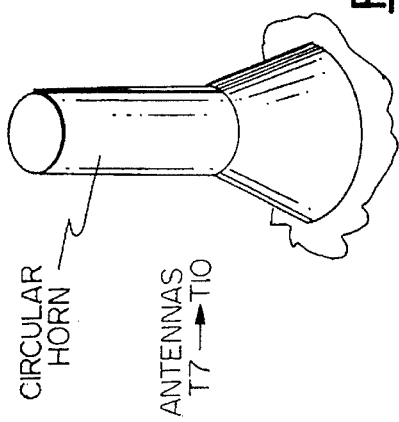
Figure 14A:
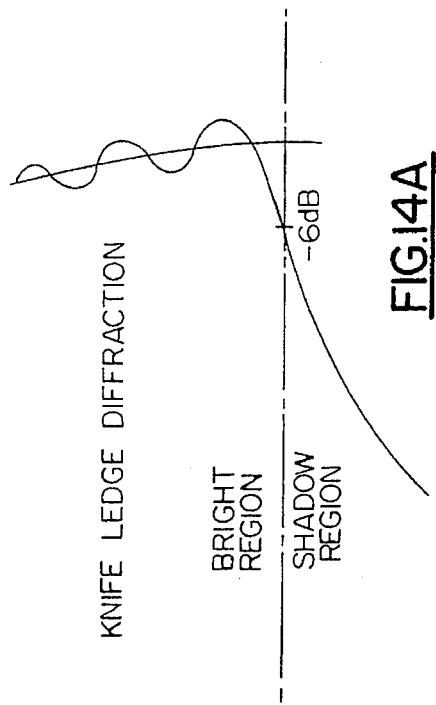
Figure 14:
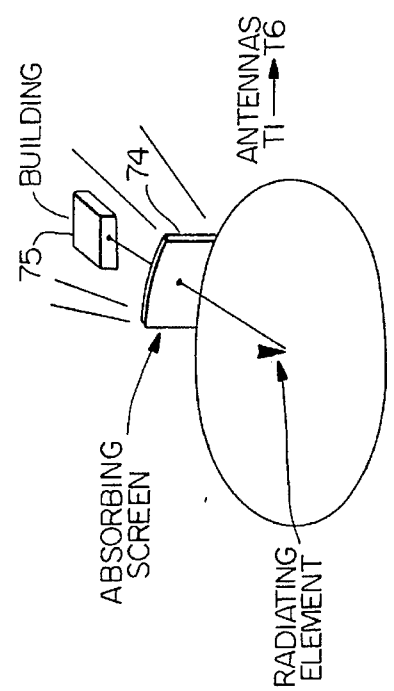

The antennas used to transmit signals from the ground to the aircraft are of two basic types, shown in FIGS. 13 and 14. Antennas which are used to guide the aircraft during taxiing are shown in FIG. 13 and are representative of antennas T7 through T10. These are preferably circular or sector horn type antennas having a radiation lobe (FIG. 13A) here shown in vertical section, the lobe being more or less uniform for 360° about the vertical axis of the antenna. The antenna's main lobe is tilted upwards so that a steep amplitude gradient is present on the horizon. This gradient serves to minimize the multipath- to-direct signal voltage ratio received in the aircraft due to ground reflections.

The landing antennas (T1 through T6) are ground-plane antennas shown in FIG. 14. The radiating element is that of a monopole above a large conducting ground plane. This produces a knife edge diffraction pattern near the horizon as shown in FIG. 14A, which minimizes the multipath to direct signal ratio due to ground reflections while providing a quasi-hemispheric coverage above the horizon. Absorbing screens 74 may be positioned on the ground plane at selected azimuthal angles to minimize the radiation in the direction of substantial reflectors such as building 75.

While the invention has been described in detail with respect to a preferred embodiment, it should be understood that the invention is not limited to that precise embodiment. Rather, many modifications and variations would present themselves to those of skill in the art without departing from the scope and spirit of this invention, as defined in the appended claims.

What is claimed is:

1. High precision radio interferometry arrangement to guide an aircraft to a runway during a landing maneuver, comprising:

a plurality of antennas, including a first antenna and a second antenna disposed at respective locations at a predetermined distance along said runway and a predetermined elevation thereabove, and spaced at predetermined distances at opposite sides of the runway;

a master transmitter associated with the first antenna and which provides same with a frequency modulated signal in which a continuous wave rf carrier at a predetermined center frequency is modulated by a modulating signal having a predetermined modulating frequency and in which the frequency modulated signal has a predetermined frequency deviation, including sideband modulating means providing a pair of sideband signals which track the master transmitter modulated signal in frequency and phase, the pair of sideband signals being disposed symmetrically above and below the master transmitter signal and being separated therefrom by a first frequency offset;

a slave transmitter associated with said second antenna and providing same with a second pair of frequency modulated sideband signals, including a second sideband modulating means providing said second pair of sideband signals which track the master transmitter modulated signal in frequency and phase, the pair of sideband signals being disposed symmetrically above and below the master transmitter signal and being separated therefrom by a second frequency offset which is unique to said second sideband modulating means;

synchronizing means for synchronizing said master transmitter and said slave transmitter, so that said sideband carriers and said modulating signal are in synchronism at said transmitters; and an airborne receiver situated in each of one or more aircraft for receiving the signals emitted by the first and second antennas, including means for demodulating the respective signals to a common frequency, and means for phase-comparing the demodulated signals from the respective antennas and for deriving accurate positioning information for said aircraft.

2. High precision radio interferometry arrangement according to claim 1 wherein the frequency deviation is on the order of ±250 MHz thereby suppressing path length difference errors that may arise from phase errors produced by a multipath propagation environment.

3. High precision radio interferometry arrangement according to claim 1 wherein said modulating signal is on the order of 20 Hz and has a signal waveshape that includes a smooth transition from a flat lower plateau to a flat upper plateau and a smooth transition from the upper plateau to the lower plateau.

4. High precision radio interferometry arrangement according to claim 1 wherein said antennas also include a third antenna and a fourth antenna disposed at said distance along said runway and at said elevation thereabove, and spaced beyond the respective first and second antennas, and with respective slave transmitter means supplying the associated third and fourth antennas with respective third and fourth pairs of frequency modulated sideband signals, which are respectively a third predetermined frequency offset and a fourth predetermined frequency offset above and below said master frequency modulated signal.

5. High precision radio interferometry arrangement according to claim 1, wherein said antennas also include a fifth antenna and a sixth antenna disposed at respective locations spaced a short distance along the runway from said first and second antenna, at another elevation below said predetermined elevation at said first and second antennas and spaced laterally of said runway substantially the same distance as said first and second antennas, the pairs of said first and fifth antennas and said second and sixth antennas each defining a medial plane that has an elevation of substantially three degrees relative to said runway.

6. High precision radio interferometry arrangement according to claim 5, wherein said fifth and sixth antennas have associated respective slave transmitters for supplying said fifth and sixth antennas with respective fifth and sixth frequency modulated sideband signals which are respectively a fifth and a sixth predetermined offset above and below the master frequency modulated signal.

7. High precision radio interferometry arrangement according to claim 1 wherein said synchronizing means include a central source of synchronizing signals and respective fiber optic cables, each cut to a precise length and actively path length stabilized, connecting said central source to each of said rf transmitters.

8. High precision radio interferometry arrangement according to claim 1 wherein said airborne receiver means includes an antenna for receiving the rf signals from said respective antennas, analog signal conditioning means for demodulating the sideband modulated signals from each of said plurality of antennas, phase comparing means for decoding the phase of the respective demodulated signals, and means for supplying phase difference information to a signal processor to derive said positioning information about said aircraft.

9. High precision radio interferometry arrangement according to claim 8 wherein said phase comparing means include transversal filtering means which measure the phase difference between signals from two of said antennas during each of a plurality of successive plateaus of said modulating signal and outputs a weighted average of the measured phase difference which represents an absolute unambiguous path length difference between the two respective antennas.

10. High precision radio interferometry arrangement according to claim 9 wherein said airborne receiver means includes means for updating said unambiguous path length difference between said two antennas by measuring changes in path length difference which occur between one time of measurement of said unambiguous path length difference and a future time by measuring a change in phase difference at a plateau frequency.

11. High precision radio interferometry arrangement according to claim 9, wherein said airborne receiver includes means for updating multiple unambiguous path length difference measurements between said two antennas to a common time, and averaging said measurements to compensate for errors contained in individual path length difference measurements.

12. High precision radio interferometry arrangement according to claim 11 wherein said airborne receiver includes means for updating the averaged unambiguous path length difference between said two antennas to a future time by measuring the change in path length difference between a time of averaging and the future time in accordance with a change in phase difference at a plateau frequency occurring between the time of averaging and the future time.

13. High precision radio interferometer arrangement according to claim 8 wherein said modulating signal has a waveshape that includes a smooth transition from a flat lower plateau to a flat upper plateau and a smooth transition from the upper plateau to a successive lower plateau, and further including means for measuring the rate of change of path length difference by measuring a phase difference at two successive upper plateaus or lower plateaus multiplying by the wavelength of the plateau frequency and dividing by 360° and by the time interval between measurement.

14. High precision radio interferometer arrangement according to claim 8 wherein said airborne receiver means includes means for comparing a desired position of the aircraft with a present calculated position and producing a corresponding error signal, and means providing said error signal to an autopilot device to maneuver the aircraft so as to minimize said error signal.

15. High precision radio interferometer arrangement according to claim 8 wherein said airborne receiver means includes means for transforming aircraft position and velocity data from a hyperbolic coordinate system to a runway centered Cartesian coordinate system.

16. High precision interferometer arrangement according to claim 1 wherein said plurality of antennas each include a monopole antenna disposed above a highly conductive ground plane to minimize a multipath to direct signal ratio received by the landing aircraft.

17. High precision interferometer arrangement according to claim 16 wherein said antennas also each include an absorbing fence arranged at selected azimuthal locations to minimize the magnitude of the radiation incident upon strong reflecting surfaces.

18. High precision radio interferometry arrangement to guide an aircraft while on the ground comprising:

a plurality of antennas, including at least a first antenna and a second antenna disposed at respective first and second locations at said airport;

a master transmitter associated with the first antenna and which provides same with a frequency modulated signal in which a continuous wave rf carrier at a predetermined center frequency is modulated by a modulating signal having a predetermined modulating frequency and in which the frequency modulated signal has a predetermined frequency deviation, including sideband modulating means providing a pair of sideband signals which track the master transmitter modulated signal in frequency and phase, the pair of sideband signals being disposed symmetrically above and below the master transmitter signal and being separated therefrom by a first frequency offset;

a slave transmitter associated with said second antenna and providing same with a second pair of frequency modulated sideband signals, including a second sideband modulating means providing said second pair of sideband signals which track the master transmitter modulated signal in frequency and phase, the pair of sideband signals being disposed symmetrically above and below the master transmitter signal and being separated therefrom by a second frequency offset which is unique to said second sideband modulating means;

synchronizing means for synchronizing said master transmitter and said slave transmitter so that, said sideband signals and said modulating signal are in synchronism at said transmitters; and a receiver situated in each of one or more aircraft for receiving the signals emitted by the first and second antennas, including means for demodulating the respective signals to a common frequency, and means for phase-comparing and demodulating signals from the respective antennas and for deriving accurate positioning information for said aircraft.

19. High precision radio interferometry arrangement according to claim 18, wherein said plurality of antennas includes a third antenna and a fourth antenna disposed at respective third and fourth locations the first through fourth locations being distributed about said runway or taxiway, and comprising respective third and fourth slave transmitter means supplying the associated third and fourth antennas with respective third and fourth pairs of frequency modulated sideband signals, which are respectively a third predetermined frequency offset and a fourth predetermined frequency offset above and below said master frequency modulated signal.

20. High precision radio interferometry arrangement according to claim 18 wherein each of said antennas has a radiation lobe which is generally uniform in a sector about the vertical axis thereof, but is tilted upwards so that a steep amplitude gradient is present on the horizon.

* * * * *